United States Patent [19]

Tirpak et al.

[11] 4,006,037
[45] Feb. 1, 1977

[54] MINERAL FILLED, HIGH IMPACT, POLYOLEFIN MOLDING COMPOSITIONS

[75] Inventors: Michael R. Tirpak, Maywood; James J. Schouten, Glen Ellyn; Charles E. Green, Brookfield, all of Ill.

[73] Assignee: The Richardson Company, Des Plaines, Ill.

[22] Filed: Nov. 4, 1974

[21] Appl. No.: 520,881

[52] U.S. Cl. .............................. 429/176; 260/42.46; 428/220
[51] Int. Cl.² ..................................... H01M 2/02
[58] Field of Search ................ 136/166; 260/42.46

[56] References Cited

UNITED STATES PATENTS

| | | | |
|---|---|---|---|
| 3,388,007 | 6/1968 | Fiandt | 136/166 |
| 3,562,790 | 2/1971 | Coover et al. | 260/42.46 |
| 3,876,608 | 4/1975 | Anderson et al. | 260/42.46 |

FOREIGN PATENTS OR APPLICATIONS

| | | | |
|---|---|---|---|
| 1,110,930 | 4/1968 | United Kingdom | 260/42.46 |

*Primary Examiner*—John H. Mack
*Assistant Examiner*—H. A. Feeley
*Attorney, Agent, or Firm*—Alan M. Abrams; John L. Alex

[57] ABSTRACT

This invention relates to thermoplastic molding compositions suitable for molding or extruding articles such as thin-walled battery containers which possess high heat distortion temperatures and simultaneously excellent impact resistance at low temperature.

18 Claims, No Drawings

MINERAL FILLED, HIGH IMPACT, POLYOLEFIN MOLDING COMPOSITIONS

Filled thermoplastics are well known and include a wide variety of polymeric compositions such as polyolefins which contain diverse filler materials. Typically the filler materials are incorporated into the thermoplastic polymers in order to modify or enhance their physical properties, such as tensile strength, flexibility or stiffness and often also as an extender to lessen the quantity of polymer required for any given molding application. For example, thermoplastic polyolefins, such as polypropylene, have been prepared utilizing such filler materials as glass fibers or minerals such as talc so as to extend the polypropylene and also to obtain certain desirable physical properties such as high heat distortion temperatures and improved rigidity. While such filler materials enhance the high temperature performance and rigidity of such polyolefins as polypropylene, they typically do so at the expense or loss of other physical properties and especially impact resistance at low temperatures.

Many molding or extrusion applications, however, do require both high heat performance and high impact resistance at low temperatures. One such application, where polypropylene is extensively employed, is the injection molding of modern battery containers having relatively thin closure walls of less than 0.1 inch which are employed for automotive lead-acid storage batteries. These battery containers are usually employed in the engine compartment of automotive vehicles which, due to current demands for higher engine performance and environmental considerations are being maintained at ever increasing temperatures, frequently in excess of 300° F. Such high temperature environments for these batteries accordingly requires that they have a high temperature stability. These battery containers, however, are also subject during use to extremely low, ambient temperatures which adds the additional requirement that such battery containers have suitable low temperature physical properties such as impact resistance in order that such battery containers be of commercial value.

Utilization of filler materials in thermoplastic polyolefins and particularly the polypropylene materials employed for applications such as battery containers has, however, generally been impractical because while such filler materials will typically induce the desired high temperature performance they do so with the concomitant loss of the desired low temperature properties such as impact resistance. This, in effect, renders such filled thermoplastics of little practical value in such applications.

It has now been discovered, however, that certain materials and specifically anhydrous alumino silicates may be employed as a type of filler in thermoplastic compositions such as propylene copolymers in order to provide a moldable or shapable composition capable of producing molded articles possessing both the desired high temperature performance and simultaneously the desired low temperature properties such as impact resistance.

Accordingly, an object of this invention is to provide a thermoplastic molding composition capable of forming articles having both high heat stability and excellent impact resistance at low temperatures. Another object is to provide such molding composition comprising a copolymer of propylene and a comonomer of a 1-olefin said copolymer containing a finely divided anhydrous alumino silicate. A further object is to provide a molding composition of a copolymer of propylene and ethylene containing feldspar. A still further object is to provide molded articles formed from such molding composition having both high heat performance properties and high impact resistance at low temperatures. An additional object is to provide a molded, battery container from such molding composition which is particularly suitable for use under varying temperature conditions. These and other objects of this invention will be apparent from the following further detailed description thereof.

In its basic embodiment the thermoplastic molding composition of this invention, which is particularly suitable for shaping or forming articles having high heat stability together with high impact resistance at low temperature, comprises a copolymer of propylene and a comonomer of a 1-olefin which contains a finely divided anhydrous alumino silicate. As previously indicated, the anhydrous alumino silicate, when incorporated into the thermoplastic composition, induces and creates the desired combination of properties in articles molded from such composition and in particular high temperature stability simultaneously with low temperature impact resistance.

The anhydrous alumino silicates which may be employed in accordance with this invention for such purpose are anhydrous alumino silicates which may be either synthetic or more preferably naturally occurring mineral materials derived from such ore bodies as granite. Such anhydrous alumino silicates typically exist in a complex form with one or more alkali or alkaline earth metals, usually as oxides, including, for example, one or more metals of sodium, potassium, calcium or barium. Included within this class of anhydrous alumino silicates are such materials as feldspar and feldsparic materials such as potash feldspars, for example orthoclase and microcline; plagioclase feldspars including sodium feldspars such as albite and calcium feldspars such as anorthite; or sodium or calcium feldspars such as oligoclase, andesine and labradorite as well as various other feldsparic minerals such as nepheline, nepheline syenite or aplite. Of the various anhydrous alumino silicates which may be employed, however, feldspar is the preferred material and particularly the naturally occurring feldsparic, anhydrous sodium potassium aluminum silicates and the feldsparic, anhydrous sodium, potassium and calcium alumino silicates such as anorthoclase.

Typically the alumino silicates contain silicates calculated as silicon dioxide (SiO) in excess of 50 weight percent or more usually above 60 weight percent and aluminum calculated as aluminum oxide ($Al_2O_3$) usually above about 10 and more usually above about 12 weight percent. The balance of the anhydrous alumino silicate typically comprises a predominance of the alkali or alkaline earth metals and minor amounts of other trace metals. For example, the alkali or alkaline earth metals calculated as oxides usually constitute from above about 5 or more usually above about 15 weight percent of the alumino silicate. Examples of anhydrous alumino silicates which are suitable for use in the present invention have the following typical chemical analysis in weight percent:

| | | | | |
|---|---|---|---|---|
| Silicon dioxide | (SiO) | 61 | 67.8 | 76.3 |

-continued

| | | | | |
|---|---|---|---|---|
| Aluminum oxide | (Al₂O₃) | 23 | 19.4 | 14.3 |
| Iron oxide | (Fe₂O₃) | trace | 0.08 | 0.08 |
| Titanium oxide | (TiO₂) | nil | trace | trace |
| Calcium oxide | (CaO) | 0.7 | 1.7 | 1.2 |
| Magnesium oxide | (MgO) | trace | trace | trace |
| Sodium oxide | (Na₂O) | 9.8 | 7.0 | 5.1 |
| Potassium oxide | (K₂O) | 4.6 | 3.8 | 2.8 |
| Manganese oxide | (MnO) | nil | none | none |
| Copper oxide | (CuO) | nil | none | none |
| Ignition loss | | 0.6 | 0.2 | 0.2 |

The anhydrous alumino silicates such as feldspar which may be used in accordance with the present invention are readily available commercially from a variety of different sources. For example, anhydrous, sodium, potassium and calcium alumino silicates are sold under such trade designations as LU-340 by Lawson United Feldspar Mineral Company of Spruce Pine, N.C. and anhydrous, sodium, potassium alumino silicates are sold under such trade names as Minex by American Nepheline Corporation of Columbus, Ohio.

The anhydrous alumino silicates which improve the properties of thermoplastic compositions in accordance with this invention, in certain particularly preferred embodiments, may possess additional and desired characteristics involving such properties as particle size, hardness and absorptivity. In general the alumino silicates must be in a finely divided state and suitably have an average particle size within the range of from about 4 to 25 microns with a more limited range of from about 6 to about 15 microns being generally preferred, particularly when employing such alumino silicates as feldspar. The particular particle size chosen within this range may, of course, be varied somewhat depending upon the particular thermoplastic composition and level of alumino silicate employed as well as the particular properties desired for the molded article and moldability of the composition. Generally, however, as the particle size is reduced within this range the impact resistance decreases somewhat and as the particle size is increased the final molded article tends to have a more abrasive surface.

The hardness of the particular anhydrous alumino silicate utilized may also generally influence the ultimate properties of the articles molded from the thermoplastic molding compositions and in general the alumino silicate should have a hard surface and preferably within the range of from about 5.0 to 6.5 on the Mohs' scale with a more limited range of from about 6.0 to 6.5 generally being suitable under most circumstances. In addition and in certain especially preferred embodiments the alumino silicate should have a surface with a relatively low absorptivity, that is the surface which is not highly absorbent so as to excessively absorb the thermoplastic composition onto its surface. Accordingly, such alumino silicates advantageously have absorptivities in terms of oil absorption in accordance with ASTM Method D 281 of generally less than 30 to 40 pounds of oil per hundred pounds of alumino silicate and typically within the range of from about 12 to about 30 pounds of oil per hundred pounds of the anhydrous alumino silicate.

The anhydrous alumino silicates of the above description and in accordance with this invention, are incorporated into a copolymer of propylene and a comonomer of a 1-olefin other than propylene having from about 2 to about 6 carbon atoms per molecule. The comonomer which may be copolymerized with the propylene to form the desired propylene copolymer for employment in this invention comprises a 1-olefin ($\alpha$-olefin), that is where the olefinic double bond is on the terminal carbon atom. Examples of suitable comonomers include ethylene, 1-butylene or 1-hexene which form with the propylene such suitable copolymers as propylene-ethylene, propylene-butylene or propylene-hexene. Typically such propylene copolymers contain propylene above 50 weight percent and preferable within the range of from about 70 to 95 weight percent and more advantageously within the range of from about 75 to about 90 weight percent with the comonomer ranging from about 5 to about 30 or more usually from about 10 to 25 weight percent of the copolymer.

The particular comonomer selected for co-polymerization with the propylene in forming the copolymer may, of course, be varied and will be a function of the desired properties of the molding composition and the particular articles to be molded from such molding composition. Of the various comonomers which may be used, however, ethylene is preferred and especially when used to form random or block copolymers of propylene-ethylene. A typical propylene-ethylene copolymer of this preferred type has about 75 to about 90 weight percent propylene with the balance being ethylene particularly so as to induce a tough, elastic characteristic to the copolymer. When preparing battery containers by injection molding, these preferred propylene-ethylene copolymers are especially suitable particularly when employed with feldspar as the alumino silicate so as to form the preferred molding compositions of this invention. Examples of the propylene-ethylene copolymers within this preferred class are described in U.S. Pat. Nos. 3,798,288 and 3,833,551.

In general the thermoplastic molding compositions of this invention may be prepared by simply mixing the desired propylene copolymer and the anhydrous alumino silicate together under suitable mixing and blending conditions so as to form the desired molding composition. The proportions of the composition components may be varied depending upon such factors as the specific copolymer and alumino silicate utilized as well as the desired molding properties for such composition and in addition the ultimate properties desired for the articles molded from such composition. In general and in order to obtain the desired properties in accordance with this invention, the copolymer should be present above 50 weight percent and suitably within the range of from about 60 to about 95 weight percent of the composition; and the anhydrous alumino silicate should be present within the range of less than 50 weight percent and suitably from about 5 to about 40 weight percent of the composition. More limited ranges are generally preferred, however, and especially for the preferred molding compositions utilized in the injection molding of battery containers where the unique combination of high heat stability and low temperature impact resistance is particularly required. For example and when utilizing the preferred copolymers such as random or block propylene-ethylene copolymers and feldspar as the alumino silicate, the propylene-ethylene polymer should be present within the range of from about 65 to about 90 weight percent of the composition; and the anhydrous alumino silicate should be present within the range of from about 10 to about 35 weight percent of the composition.

The specific proportions of the components for the various molding compositions can, of course, be varied within these broad and preferred ranges in order to obtain different molding properties for the compositions as well as different properties for the molded articles prepared from such molding compositions. For example, when employing the preferred molding compositions of this invention for use in preparing thin walled battery containers, a particularly suitable composition for obtaining the desired combination of physical properties comprises about 75 weight percent of a propylene-ethylene copolymer and about 25 weight percent of feldspar.

In mixing or blending the various components to form the molding compositions of this invention a variety of different conventional techniques may be suitable employed depending upon the particular physical form of the various components, for example, whether the propylene copolymer is in powder or pellet form, the level of alumino silicate to be incorporated and whether the molding composition is to be employed in compression or injection molding or in extrusion applications. In a relatively simple procedure, and when the components are advantageously in powder form, the components are basically added to a suitable mixer in the desired proportions and then mixed for a period sufficient to obtain the desired degree of dispersion or blending of the components.

The molding composition thus mixed may then be directly employed in a molding or extrusion operation. Generally, however, it is usually desirable to further mix or blend the components to obtain a higher, desired degree of dispersion or intermixing of the components. For example, after the components are mixed as described above the mixture may then be charged to a suitable extruder and extruded therein under elevated temperature and pressure to obtain a further thorough mixing and blending of the components. The strand, extrudate thus produced can then be cut in accordance with standard procedures into pellet form and the pellets thereafter conveniently and suitable employed in conventional compression or injection molding or extrusion apparatus to form the desired molded article.

As indicated, the thermoplastic molding compositions of this invention may be employed to form articles having both heat stability, for example, a high heat distortion temperature and desirable low temperature properties such as impact resistance. For example, the articles molded from the compositions of this invention generally have heat distortion temperatures, that is deflection temperatures, generally in excess of about 250° F under 66 pounds per square inch loading when evaluated in accordance with ASTM Method D 648-56 and impact resistant at 0° F generally in excess of 20 and often above 30 to 80 inch pounds as determined by the falling weight method of ASTM Test D-639-72. Articles having these desirable combinations of properties may be formed from the molding compositions of this invention through utilization of conventional procedures under elevated temperatures and pressure using either injection or compression molding or extrusion techniques. Such articles, can, of course, be of any desired shape or configuration and will be particularly suitable for application in environments where there is a variation in temperature. One particularly suitable application, as previously discussed, is the modern thin-walled battery container employed in automobile applications where the desired combination of the high heat stability and high impact resistance at low temperature is necessary in the use of such container to protect against elevated temperatures in the engine compartment and to protect against impact breakage at low temperatures.

The thermoplastic molding compositions of this invention are moreover especially suitable for use in preparing such battery containers by injection molding techniques because in addition to having the desired combination of high and low temperature properties they further possess a particularly desirable combination of other properties essential for successful use in the manufacture and employment of lead-acid storage batteries. For example the presence of the anhydrous alumino silicate within the molding composition increases the thermal conductivity of the molding composition which allows a faster heating of the molding composition to a fluid state and a quicker cooling and solidification of the molded article during the injection molding operation. This permits, for example, much faster injection molding cycles and therefore a more economical operation. Also because the molding composition has such excellent melt flow properties, material stresses are reduced when injection molding complex shaped articles such as thin walled, multi-partitioned battery containers where the side walls and partitions, due to their excessive length must be formed in deep mold cavities. In addition the molding compositions of this invention produce molded articles with a desirable degree of rigidity. This, in the case of thin-walled battery containers, reduces the bulging or flexing of the relatively thin walls and partitions and prevents destruction of the container during operation. These molding compositions, moreover, because of the relatively inert nature of the anhydrous alumino silicates are particularly resistant to the deleterious effects of battery acids and, unlike many conventional filler materials, do not absorb excessive amounts of such acids so as to cause a weakening of the container and/or interference with the battery performance. This relative inertness of the alumino silicates further serves to avoid any adverse interaction or interference with the coloring pigments conventionally employed in thermoplastics which allows ready coloring of the molding compositions of this invention with such conventional pigments so as to produce, in the case of battery containers, a wide variety of commercially desirable colors and markings.

The following examples are offered to illustrate the thermoplastic molding compositions of this invention, the preparation thereof and their utilization in preparing certain molded articles such as battery containers. These examples however are not intended to limit the general scope of this invention in strict accordance therewith.

EXAMPLE I

A series of thermoplastic molding composition samples were prepared in accordance with this invention as follows and were then utilized to injection mold thin-walled, battery containers according to the indicated procedure:

The compositions were dry blended by adding the following components in the indicated weight percentages to a suitable mixer

| SAMPLE NO. | 1 | 2 | 3 | 4 | 5 | 6 |
|---|---|---|---|---|---|---|
| COMPONENT | | | WEIGHT PERCENT | | | |
| Propylene-ethylene copolymer pellets, (Amoco 20-6016) | 100 | 90 | 80 | 70 | 60 | 50 |
| Anhydrous, sodium, potassium and calcium alumino silicate, (feldspar powder having a mean particle size of 9 microns and an oil absorptivity of 18 to 19 lb/oil per lb of alumino silicate (Lawson United LU-340)) | 0 | 10 | 20 | 30 | 40 | 50 |

After the components were thoroughly mixed the composition samples were extruded and cut into pellets and the pellets thus formed for each sample were employed to injection mold multi-partitioned thin-walled battery containers having bottom and side closure wall thicknesses of less than 0.1 inches and partitions and closure walls of about 8 inches in height. The low temperature impact resistance of the sample containers were determined together with the heat distortion temperatures of corresponding molded specimens with the indicated results.

| SAMPLE NO. | 1 | 2 | 3 | 4 | 5 | 6 |
|---|---|---|---|---|---|---|
| Deflection Temperature, °F at 66 psi (ASTM Method D-648-56) | 239 | 254 | 257 | 261 | 261 | 263 |
| Impact Resistance at 0° F by the falling weight method, inch pounds (1) | greater than 100 | 93 | 87 | 67 | 27 | below 10 |

(1) Inches of height that a 2 or 4 pound weight falls before damage is observed in accordance with procedures of ASTM Test D-639-72

The injected molded battery container formed from composition sample No. 4 also was subjected to the following tests to establish its suitability as a container for lead-acid storage batteries with the indicated results:

| | |
|---|---|
| Bulge (2) at 200° F (ends), inches | 0.1 |
| Acid Absorption, (2) mg/sq inch | none after 7 days |
| Dielectric Strength (2), volts/mil | greater than 550 |

(2) Procedures of ASTM Test D-639-72

All of the above values for the indicated test were equal to or in excess of the values generally recognized as basically required for lead-acid, storage battery containers. It may also be observed from the above data that the incorporation of the anhydrous alumino silicate into the propylene copolymer produced the desired gain in the heat distortion temperature.

EXAMPLE II

Thermoplastic molding compositions were prepared containing certain mineral materials different from the anhydrous alumino silicates of the present invention as follows and were employed to injection mold, thin-walled battery containers according to the procedures of Example I.

The molding compositions had the following formulations:

| SAMPLE NO. | 7 | 8 |
|---|---|---|
| COMPONENTS | WEIGHT PERCENT | |
| Propylene-ethylene, copolymer pellets (Amoco 20-6016) | 70 | 75 |
| Anhydrous Calcium Sulfate (Snow White-United States Gypsum having a mean particle size g 5.5 microns) | — | 25 |
| Talc, powder (anhydrous magnesium silicate having a mean particle size of 5 microns) | 30 | — |

Battery containers were injected molded using the above composition Samples 7 and 8 and the heat distortion temperatures and low temperature impact resistance were determined in accordance withthe procedure of Example I with the indicated results:

| SAMPLE NO. | 7 | 8 |
|---|---|---|
| Deflection temperature, °F at 66 psi (ASTM D-648-56) | 281 | 265 |
| Impact resistance at 0° F, inch pounds | less than 10 | 40 |

As may be observed from the above data from Examples I and II for composition samples 2 through 8, all of such samples possessed the desired high heat properties resulting from incorporating the various mineral materials into the thermoplastic. The compositions of the present invention, however, namely samples 2 through 5 also possessed in addition the highly desirable impact properties at low temperature. Compare in particular the impact properties for samples 7 and 8 with that of sample 4 having comparable formulations except for the particular minerals employed. In samples 7 and 8, using talc and calcium sulfate respectively, the impact values are less than 10 or 40 inch pounds whereas with sample 4 employing a feldsparic, anhydrous alumino silicate the impact resistance is about 67 inch pounds. This impact resistance in combination with the high heat property does, of course, render the molding compositions containing the anhydrous alumino silicate of unique value in such applications as multi-partitioned containers for lead-acid storage batteries where structural stability over a wide temperature range is a critical requirement.

We claim:

1. A thermoplastic molding composition suitable for forming articles having high heat stability with high impact resistance at low temperature consisting essentially of a copolymer of propylene and ethylene, said copolymer containing a finely divided feldsparic anhydrous alumino silicate wherein the feldsparic alumino silicate has an oil absorptivity of from about 12 to 30 pounds of oil per hundred pounds of the feldsparic alumino silicate and a Mohs' hardness of from about 5.0 to about 6.5, the copolymer contains from 75 to 90 weight percent propylene and 10 to 25 weight percent ethylene and the feldsparic alumino silicate is present within the range of from about 10 to about 35 weight percent of the composition.

2. The composition of claim 1 wherein the copolymer is a random or block copolymer of propylene-ethylene.

3. The composition of claim 1 wherein the anhydrous feldsparic alumino silicate is an aluminum silicate combined with at least one metal selected from the group consisting of an alkali or alkaline earth metal.

4. The composition of claim 3 wherein the metal is at least one metal selected from the group consisting of calcium, sodium, potassium or barium.

5. The composition of claim 1 wherein the anhydrous feldsparic alumino silicate is feldspar.

6. A composition of claim 1 wherein the anhydrous feldspar alumino silicate contains aluminum calculated as $Al_2O_3$ in excess of about 10 weight percent, silicates calculated as SiO in excess of about 50 weight percent and one or more alkali or alkaline earth metal calculated as an oxide in excess of about 5 weight percent of the alumino silicate.

7. The composition of claim 3 wherein the feldsparic alumino silicate has an average particle size of from about 4 to about 25 microns.

8. The composition of claim 7 wherein the feldsparic alumino silicate has an average particle size of from about 6 to about 15 microns.

9. The composition of claim 1 wherein the composition is moldable to form molded articles having a heat distortion temperature above about 250° F and an impact resistance by the falling weight method at 0° F above about 20 inch-pounds.

10. An article having high heat stability with high impact resistance at low temperature such article being formed from a thermoplastic molding composition consisting essentially of a copolymer of propylene and ethylene, said copolymer containing a finely divided feldsparic anhydrous alumino silicate wherein the feldsparic alumino silicate has an oil absorptivity of from about 12 to 30 pounds of oil per hundred pounds of the feldsparic alumino silicate and a Mohs' hardness of from about 5.0 to about 6.5, the copolymer contains from 75 to 90 weight percent propylene and 10 to 25 weight percent ethylene and the feldsparic alumino silicate is present within the range of from about 10 to about 35 weight percent of the composition.

11. The article of claim 10 wherein the feldsparic alumino silicate is an anhydrous aluminum silicate combined with at least one metal selected from the group consisting of an alkali or alkaline earth metal.

12. The article of claim 11 wherein the metal is at least one metal selected from the group consisting of calcium, sodium, potassium or barium.

13. The article of claim 10 wherein the anhydrous feldsparic alumino silicate is feldspar.

14. The article of claim 10 wherein the anhydrous feldsparic alumino silicates contain aluminum calculated as $Al_2O_3$ in excess of about 10 weight percent, silicates calculated as SiO in of about 50 weight percent and one or more alkali or alkaline earth metals calculated as an oxide in excess of about 5 weight percent of the alumino silicate.

15. The article of claim 11 wherein the anhydrous feldsparic alumino silicate has an average particle size of from about 4 to about 25 microns.

16. The article of claim 15 wherein the anhydrous feldsparic alumino silicate has an average particle size of from about 6 to about 15 microns.

17. The article of claim 10 wherein such composition is moldable to form molded articles having a heat distortion temperature above about 250° F and an impact resistance by the falling weight method at 0° F above about 20 inch pounds.

18. The article of claim 10 wherein the article is a battery container for lead-acid storage batteries having relatively thin closure walls of less than 0.1 inches where such closure walls have a heat distortion temperature in excess of about 250° F and an impact resistance by the falling weight method at 0° F in excess of 20 inch pounds.

* * * * *

UNITED STATES PATENT AND TRADEMARK OFFICE
CERTIFICATE OF CORRECTION

PATENT NO. : 4,006,037
DATED : February 1, 1977
INVENTOR(S) : Michael R. Tirpak et al.

It is certified that error appears in the above-identified patent and that said Letters Patent are hereby corrected as shown below:

Column 3, line 54, "the" should read --a--

Column 5, line 17, "able" should read --ably--

Column 5, line 42, "suitable" should read --suitably--

Column 7, line 8 of the table appearing at the top of the column as "lb/oil per lb of alumino" should read --lbs. oil per 100 lbs. of alumino--

Column 8, line 6 of the table appearing at the top of the column, "g" should read --of--

Column 8, line 41, "withthe" should read --with the--

Signed and Sealed this

Fourteenth Day of March 1978

[SEAL]

Attest:

RUTH C. MASON
Attesting Officer

LUTRELLE F. PARKER
Acting Commissioner of Patents and Trademarks